(12) United States Patent
Thomasberg et al.

(10) Patent No.: US 12,535,318 B2
(45) Date of Patent: Jan. 27, 2026

(54) DETERMINING SCANNER ERROR

(71) Applicant: Mobile Industrial Robots A/S, Odense S (DK)

(72) Inventors: Kristian Thomasberg, Ringe (DK); Jeppe Skaarup Lyster, Odense SØ (DK)

(73) Assignee: Mobile Industrial Robots A/S, Odense S (DK)

( * ) Notice: Subject to any disclaimer, the term of this patent is extended or adjusted under 35 U.S.C. 154(b) by 92 days.

(21) Appl. No.: 17/508,292

(22) Filed: Oct. 22, 2021

(65) Prior Publication Data

US 2023/0128651 A1 Apr. 27, 2023

(51) Int. Cl.
*G01C 11/06* (2006.01)
*G01S 7/497* (2006.01)
*G01S 17/42* (2006.01)
*G06V 20/56* (2022.01)

(52) U.S. Cl.
CPC ............ *G01C 11/06* (2013.01); *G01S 7/4972* (2013.01); *G01S 17/42* (2013.01); *G06V 20/56* (2022.01)

(58) Field of Classification Search
CPC ....... G05D 1/00; G05D 2201/00; G06V 20/00
See application file for complete search history.

(56) References Cited

U.S. PATENT DOCUMENTS

| 5,983,161 | A | 11/1999 | Lemelson et al. |
| 6,459,955 | B1 | 10/2002 | Bartsch et al. |
| 8,577,538 | B2 | 11/2013 | Lenser et al. |
| 9,606,544 | B2 | 3/2017 | Gariepy et al. |
| 9,663,025 | B2 | 5/2017 | Drexler et al. |
| 9,746,852 | B1 | 8/2017 | Watts |
| 9,891,630 | B2 | 2/2018 | Gariepy et al. |
| 9,918,605 | B2 | 3/2018 | Wolfe et al. |
| 9,963,155 | B2 | 5/2018 | Gariepy et al. |
| 10,585,440 | B1 | 3/2020 | Gariepy et al. |
| 10,623,727 | B1 * | 4/2020 | Frevert ................ H04N 17/002 |
| 10,668,617 | B2 | 6/2020 | Jacobsen et al. |
| 10,706,321 | B1 * | 7/2020 | Chen ..................... G06T 3/4007 |
| D907,677 | S | 1/2021 | Mork et al. |
| 10,916,029 | B2 | 2/2021 | Kabel et al. |
| D929,478 | S | 8/2021 | Mork et al. |
| 11,087,494 | B1 * | 8/2021 | Srinivasan ........... G06V 20/584 |

(Continued)

FOREIGN PATENT DOCUMENTS

| EP | 3167784 A1 | 5/2017 |
| WO | 2016165721 A1 | 10/2016 |

(Continued)

OTHER PUBLICATIONS

You et al., "A novel LiDAR sensor alignment inspection system for automobile productions using 1-D photodetector arrays", Jun. 30, 2021, Measurement vol. 183 (Year: 2021).*

(Continued)

*Primary Examiner* — Aniss Chad
*Assistant Examiner* — Elizabeth J Slowik
(74) *Attorney, Agent, or Firm* — ArentFox Schiff LLP

(57) ABSTRACT

An example system includes a body having wheels to move along a surface, a laser-based scanner on the body to output a beam in a plane, a camera on the body to capture an image of an area in which the beam intersects an object, and one or more processing devices to determine whether at least part of the laser-based scanner is misaligned based on the image.

21 Claims, 14 Drawing Sheets

(56) References Cited

U.S. PATENT DOCUMENTS

| | | | | |
|---|---|---|---|---|
| 11,238,675 | B2* | 2/2022 | Troy | H04N 23/69 |
| 11,460,855 | B1* | 10/2022 | Lim | G05D 1/0246 |
| 11,714,193 | B1* | 8/2023 | Foster | G01S 7/4808 |
| | | | | 356/4.01 |
| 12,001,219 | B2 | 6/2024 | Jacobsen | |
| 2003/0019933 | A1* | 1/2003 | Tsikos | G06K 7/10 |
| | | | | 235/454 |
| 2003/0052169 | A1* | 3/2003 | Tsikos | G06K 7/10 |
| | | | | 235/454 |
| 2007/0219720 | A1* | 9/2007 | Trepagnier | G01S 17/931 |
| | | | | 701/300 |
| 2009/0074545 | A1 | 3/2009 | Lert, Jr. et al. | |
| 2011/0144828 | A1 | 6/2011 | Chengalva | |
| 2014/0088781 | A1 | 3/2014 | Shamlian et al. | |
| 2014/0110183 | A1 | 4/2014 | Rudakevych et al. | |
| 2014/0368651 | A1 | 12/2014 | Irschara et al. | |
| 2015/0006005 | A1 | 1/2015 | Yu et al. | |
| 2015/0362921 | A1* | 12/2015 | Hanaoka | G05D 1/0088 |
| | | | | 702/159 |
| 2016/0076892 | A1 | 3/2016 | Zhou et al. | |
| 2016/0124434 | A1 | 5/2016 | Gariepy et al. | |
| 2016/0129917 | A1 | 5/2016 | Gariepy et al. | |
| 2016/0227193 | A1* | 8/2016 | Osterwood | G01S 17/42 |
| 2016/0349749 | A1 | 12/2016 | Gariepy et al. | |
| 2017/0008085 | A1 | 1/2017 | Nguyen et al. | |
| 2017/0031366 | A1 | 2/2017 | Shamlian et al. | |
| 2017/0038776 | A1 | 2/2017 | Gariepy et al. | |
| 2017/0072558 | A1 | 3/2017 | Reynolds et al. | |
| 2017/0080850 | A1 | 3/2017 | Drexler et al. | |
| 2017/0157426 | A1 | 6/2017 | Buchsbaum | |
| 2017/0182459 | A1 | 6/2017 | Klidas et al. | |
| 2017/0197643 | A1 | 7/2017 | Gariepy et al. | |
| 2017/0232885 | A1 | 8/2017 | Drexler et al. | |
| 2017/0344009 | A1 | 11/2017 | Wernersbach | |
| 2018/0075619 | A1 | 3/2018 | Kabel et al. | |
| 2018/0281178 | A1 | 10/2018 | Jacobsen et al. | |
| 2019/0101644 | A1* | 4/2019 | DeMersseman | G01S 17/42 |
| 2019/0120948 | A1* | 4/2019 | Yang | G01S 7/4972 |
| 2019/0384314 | A1 | 12/2019 | Jacobsen et al. | |
| 2020/0004247 | A1 | 1/2020 | Jacobsen et al. | |
| 2020/0159238 | A1 | 5/2020 | Jacobsen et al. | |
| 2020/0174358 | A1* | 6/2020 | Nakagawa | G03B 21/2033 |
| 2021/0004610 | A1* | 1/2021 | Huang | G01S 7/497 |
| 2021/0082149 | A1* | 3/2021 | Sheorey | G06T 3/4007 |
| 2021/0208592 | A1 | 7/2021 | Jacobsen et al. | |
| 2021/0223786 | A1 | 7/2021 | Jacobsen et al. | |
| 2021/0247313 | A1* | 8/2021 | Ogawa | G06V 20/188 |
| 2021/0287035 | A1* | 9/2021 | Deegan | G06V 10/82 |
| 2022/0066456 | A1* | 3/2022 | Ebrahimi Afrouzi | |
| | | | | B25J 9/1697 |
| 2022/0129684 | A1* | 4/2022 | Saranin | G06F 18/23 |
| 2022/0169057 | A1* | 6/2022 | Griffin | G06V 20/58 |
| 2022/0283580 | A1* | 9/2022 | Chen | G05D 1/104 |
| 2022/0284225 | A1* | 9/2022 | Lev | G01S 17/931 |
| 2023/0005115 | A1* | 1/2023 | Bedrich | G06V 20/10 |

FOREIGN PATENT DOCUMENTS

| | | |
|---|---|---|
| WO | 2017004524 A1 | 1/2017 |
| WO | 2019/238958 A1 | 12/2019 |

OTHER PUBLICATIONS

Erke et al., "A fast calibration approach for onboard LiDAR-camera systems", Mar. 2020, International Journal of Advanced Robotic Systems vol. 17, Issue 2 (Year: 2020).*

Blizzard, Classic games, Warcraft: Orcs & Humans (1994). [Online]. Available: http://us.blizzard.com/en-us/games/legacy. [Last accessed Dec. 26, 2017].

Dixon, J., and Henlich, 0., Mobile Robot Navigation, Final Report, Imperial College, London, 27 pages (Jun. 10, 1997). [Online]. Available: https://www.doc.ic.ac.uk/~nd/surprise 97/journal/vol4/jmd/. [Accessed Jun. 22, 2017].

Dos Gamers Archive, Warcraft II: Tides of Darkness, 1 page (1995). [Retrieved Online Aug. 15, 2018. Available: http://imaae.dosaamesarchive.com/screenshots/war2 06.ona.

Expomondo, Expo 2000, Themenpark & AuBengelande, Deutschland, Holtmann International, (2000). [Online]. Available: http://expomondo.it/exoo.html.

Ferzkopp.net, 2000. [Retrieved Online Aug. 15, 2018]. Available: http://www.ferzkopp.net/MediaAndArt/Expo2000/Softwaremodule.qif.

Nedelea, A., Hyundai's Future Augmented Reality Looks Pretty Cool, 6 pages (Jan. 1, 2015). [Retrieved Online Aug. 15, 2018]. Available: https://www.carscooos.com/2015/01/hyundais-future-auamented-realitv-looks/.

Roger Russell, "roger-russell.com," 2004. [Online]. Available: https://web.archive.org/web/20050404140115/http://www.roger- russell.com/project/project.htm. [Retrieved Aug. 20, 2018].

Shenton, Collectable Clocks, Illustration 306, Projection Clock/Night Clock (1909). [Online]. Available: https://web.archive.org/web/20041012014240/http://www.mueller-maerki.com:80/hniteclk.html. [Retrieved Aug. 20, 2018.

United States Patent and Trademark Office, U.S. Appl. No. 14/883,698 Notice of Allowance and Fee(s) due, 7 pages (Nov. 29, 2011).

Zentrum fur Kunst und Medientechnologie (ZKM), Knowledge, Information, Communication Swarming with robots, Expo 2000 Hannover GmbH (2000). [Online]. Available: http://site.expo2000.de/expo2000/englisch/themenpark/frame wissen e.html.

International Search Report for PCT/EP2019/065766, 5 pages (Sep. 23, 2019).

Written Opinion for PCT/EP2019/065766, 7 pages (Sep. 23, 2019).

MIR Fleet Reference Guide. Mobile Industrial Robots A/S. Odense, SO. (Jan. 2017). V. 1.0, (pp. 1-30). 32 pages.

MIR 100 User Guide. Mobile Industrial Robots A/S. Odense, SO. (Aug. 2018). V. 1.1, (pp. 1-42). 44 pages.

MIR 100 User Guide, Mobile Industrial Robots, A/S. Odense, SO. (Nov. 2017). V. 1.0, (pp. 1-37). 39 pages.

MIR 500 User Guide, Mobile Industrial Robots, A/S. Odense, SO. (Feb. 2019). V. 1.3, (pp. 1-100). 100 pages.

Cire2047, Warddraft: Ores and Humans—Human Campaign Gameplay—Part 01, 1994 (Jan. 21, 2009). [Online]. Available: httpo://www.youtube.com/watch?y=UnGOuSWs10. [Last accessed Dec. 26, 2017].

Lucas Film, Star Wars: New Hope (1977). [Online]. Available:http://www.tbs.com/star-wars-a-new-hope. See times: (00:05:07); (00:04:43); (00:33:34).

Lucas Film, Star Wars: The Phantom Menace (1999). [Online]. Available: http://www.tbs.com/movies/star-wars-the-phantom-menace. See times: (00:6:32); (00:06:37); (00:49:39); (00:52:33); (01:13_04).

Mobile Industrial Robots ApS, MiR100 Elos Interview (Nov. 25, 2014). [Online]. Available:http//www.youtube.com/watch?v=CVqXXuVPvs.

Mobile Industrial Robots ApS, MiR100 Scan Case (English), (Jul. 1, 2015). [Online]. Available: http://www.youtube.com/watch?v=ogmGsjlimdg.

Mobile Industrial Robots ApS, MiR100 Wagon Driving (Dec. 9, 2014). [Online]. Available: http//www.youtube.com/watch?v=jGPBTERoeiO. [Last accessed on Dec. 28, 2017].

Mobile Industrial Robots ApS, MiR100 Wagon Parking (Dec. 9, 2014). [Online]. Available: http//www.youtube.com/watch?y=A4Vy8HrHoRw. [Last accessed on Dec. 26, 2017].

MovieClips, Steven Spielberg, Close Encounteres of the Third Kind (2/8) Movie CLIP—Chasing the UFOs (1977) HD (Oct. 7, 2012). [Online]. Available: http://www.youtube.com/watch?v=8MW3KJUa8FQ.

Movieclips, Steven Spielberg, Close Encounters of the Third Kind (6/8) Movie CLIP—Communicating with the Mothership (1977) HD (Oct. 7, 2012). [Online]. Available: http://www.youtube.com/watch?v=S4PYI6TzqYk.

Omron Adept Technologies Inc, Introducing the Omron LD Mobile Robot (formerly Adept Lynx), (Dec. 19, 2014). [Online]. Available: http//www.youtube.com/watch?v=ZUr6-nFtRI8.

(56) References Cited

OTHER PUBLICATIONS

SpaceX, Falcon 9 First Stage Reentry Footage from Plane (Aug. 14, 2014). [Online]. Available: http//www.youtube.com/watch?v=ullu7szab51. [Last accessed on Dec. 26, 2017].
International Search Report for International Patent Application No. PCT/EP2022/078885, mailed Jan. 31, 2023, (5 pages).
Written Opinion for International Patent Application No. PCT/EP2022/078885, mailed Jan. 31, 2023, (8 pages).
Christoph Mertz et al.: "Moving object detection with laser scanners : Moving Object Detection with Laser Scanners", Journal of Field Robotics, vol. 30, No. 1, Jul. 3, 2012 (Jul. 3, 2012), pp. 17-43, XP055460334, US ISSN: 1556-4959, DOI: 10.1002/rob.21430 Abstract; figure 17 p. 33.
Brockers et al., Towards autonomous navigation of miniature UAV, 2014, IEEE, p. 631-637 (7 pgs).
Mounting instructions, Alignment Bar (SICK Part No. 8021985) (2 pgs).
Product information, AOS LiDAR Advanced System Reliability for Area Monitoring Even in Harsh Conditions (16 pgs).
Operating instructions, TOPCON Level Sensor LS-80A/B/G/L (2 pgs).

\* cited by examiner

DETERMINING SCANNER ERROR

TECHNICAL FIELD

This specification relates generally to example techniques for determining errors in a scanner on an autonomous device.

BACKGROUND

Autonomous devices, such as mobile robots, are configured to travel within a space, such as a warehouse, independently. During travel, there is a risk that an autonomous device will collide with other objects in the space. An optical scanner may be used to detect the presence of those objects and thereby enable the autonomous device to take action that avoids collision with the detected objects.

SUMMARY

An example system includes a body having wheels to move along a surface, a laser-based scanner on the body to output a beam in a plane, a camera on the body to capture an image of an area in which the beam intersects an object, and one or more processing devices to determine whether at least part of the laser-based scanner is misaligned based on the image. The system may include one or more of the following features, either alone or in combination.

The system may be or include an autonomous vehicle. The laser-based scanner may include an emitter to provide the beam and a mirror to output the beam in the plane. The least part of the laser-based scanner that is misaligned may include at least one of, or both of, the emitter or the mirror. The image may include the surface. Determining whether at least part of the laser-based scanner is misaligned may include comparing, to a predefined distance, a distance between the surface and an intersection of the beam and the object.

The image may be a first image; the area may be a first area; the plane may be a first plane; and the beam may be a first beam. The first image may be captured at a first location. The one or more processing devices may be configured to control the body to move to a second location and to capture a second image of the object. The one or more processing devices may be configured to determine whether at least part of the laser-based scanner is misaligned based also on the second image. Determining whether at least part of the laser-based scanner is misaligned may include comparing the first image and the second image.

The first image may include an image of the first beam intersecting the object and the second image may include an image of the second beam intersecting the object. Determining whether at least part of the laser-based scanner is misaligned may include comparing a first intersection of the first beam and the object to a second intersection of the second beam and the object. Comparing the first intersection to the second intersection may include determining whether the first intersection overlaps the second intersection at least partially or whether the first intersection and the second interaction are within an acceptable tolerance of each other.

The one or more processing devices may be configured to determine that the at least part of the laser-based scanner is misaligned if the first intersection does not overlap the second intersection at least partially or the first intersection and the second interaction are not within an acceptable tolerance of each other. The one or more processing devices may be configured to change a speed of movement of the body in response to determining that the at least part of the laser-based scanner is misaligned. The one or more processing devices may be configured to reduce a speed of movement of the body in response to determining that the at least part of the laser-based scanner is misaligned. The one or more processing devices may be configured to stop movement of the body in response to determining that the at least part of the laser-based scanner is misaligned. The one or more processing devices may be configured to determine an amount of misalignment of the laser-based scanner based on where the first intersection overlaps the second intersection or by how much the first intersection and the second interaction are away from each other. The one or more processing devices may be configured to determine an amount of misalignment of the laser-based scanner also based on an incline of the surface. The system may include an accelerometer to determine the incline of the surface.

The one or more processing devices may be configured to determine an incline of the surface based on two or more images captured by the camera of two or more areas containing at least parts of planes corresponding to two or more beams output by the laser-based scanner.

The system may include one or more actuators that are controllable to move the at least part of the laser-based scanner to correct for misalignment of the at least part of the laser-based scanner. The system may include non-transitory machine-readable memory storing data representing misalignment of the at least part of the laser-based scanner. The system may be or include an autonomous vehicle, and the non-transitory machine-readable memory many store additional data representing a configuration of the autonomous vehicle at a time of the misalignment. The one or more processing devices may be on the autonomous vehicle. The one or more processing devices may be part of a computing system that is not on the autonomous vehicle but that is in communication with the autonomous vehicle.

Any two or more of the features described in this specification, including in this summary section, can be combined to form implementations not specifically described herein.

The systems, techniques, devices, and processes described herein, or portions thereof, can be implemented as and/or controlled by a computer program product that includes instructions that are stored on one or more non-transitory machine-readable storage media, and that are executable on one or more processing devices to control (e.g., to coordinate) the operations described herein. The systems, techniques, devices, and processes described herein, or portions thereof, can be implemented as an apparatus, method, or electronic system that can include one or more processing devices and memory to store executable instructions to implement various operations. The systems, techniques, processes, devices, and/or components described herein may be configured, for example, through design, construction, arrangement, placement, programming, operation, activation, deactivation, and/or control.

The details of one or more implementations are set forth in the accompanying drawings and the description below. Other features and advantages will be apparent from the description and drawings, and from the claims.

DESCRIPTION OF THE DRAWINGS

Like reference numerals in different figures indicate like elements.

DETAILED DESCRIPTION

Described herein are examples of autonomous devices or vehicles, such as a mobile robot, that are configured to move within a space, such as a warehouse or factory. An example autonomous device (or "device") is configured to move along a surface, such as the floor of a warehouse. The device includes a body for supporting the weight of an object and wheels on the body to enable the body to traverse the surface. The example device includes sensors on the body configured for detecting objects in a field-of-view (FOV) or simply "field". The sensors on the device may be line-of-sight, which includes detecting objects that the sensors can see.

Figure 1:
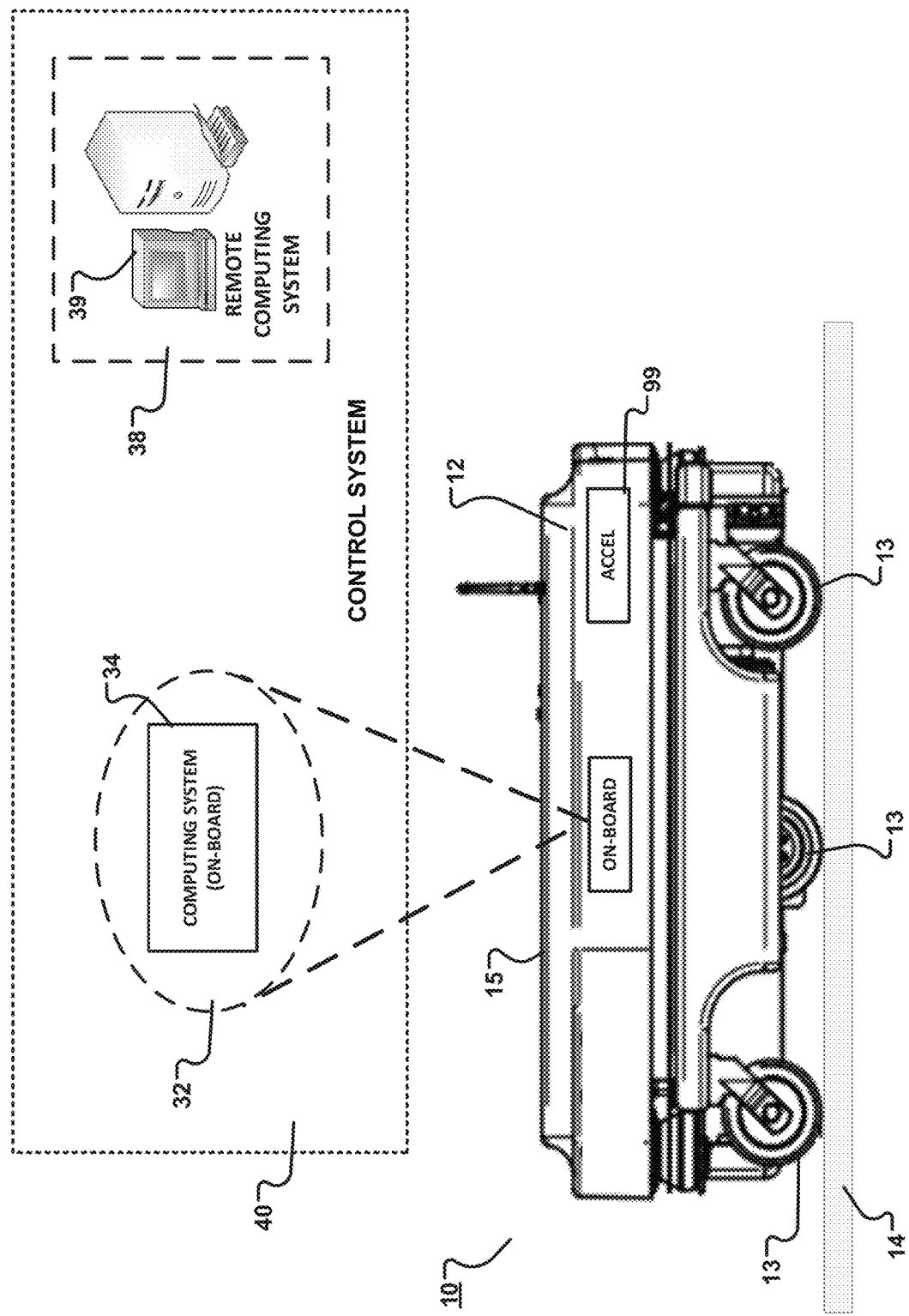
FIG. 1 is a side view of an example autonomous device.

An example of an autonomous device is autonomous robot 10 of FIG. 1. In this example, autonomous robot 10 is a mobile robot and is referred to simply as "robot". Robot 10 includes a body 12 having wheels 13 to enable robot 10 to travel across a surface 14, such as the floor of a warehouse, a factory, or other terrain. Robot 10 includes a support area 15 configured to support the weight of an object. In this example, robot 10 may be controlled to transport the object from one location to another location. Robot 10 includes various sensors for use in detecting the robot's location.

In this example, robot 10 includes two types of long-range sensors: a three-dimensional (3D) camera and a light detection and ranging (LIDAR) scanner. These sensors are line-of-sight sensors in that they rely on visibility of an object for detection. The robot, however, is not limited to this configuration or these sensors. The LIDAR scanner may be used for detecting objects, including human beings, within a predefined safety zone around the robot. The robot takes appropriate action, as described herein, if such objects are detected. With two-dimensional (2D) scanners, detection may be improved if the scanners are at a predefined height and the scanning plane is horizontal or close to horizontal. For example, if the 2D scanning plane is a below a predefined horizontal line, the scanner may see and identify the ground as an obstacle and bring the robot to a stop. If the scanning plane is above horizontal line, the scanner may miss (look over) objects that are near to the ground. This can lead to collisions between the robot and such objects. Misalignments of the scanner can occur during production, maintenance, and/or operation of the scanner and robot, and can remain undetected. The techniques described herein may address these issues.

Figure 2:
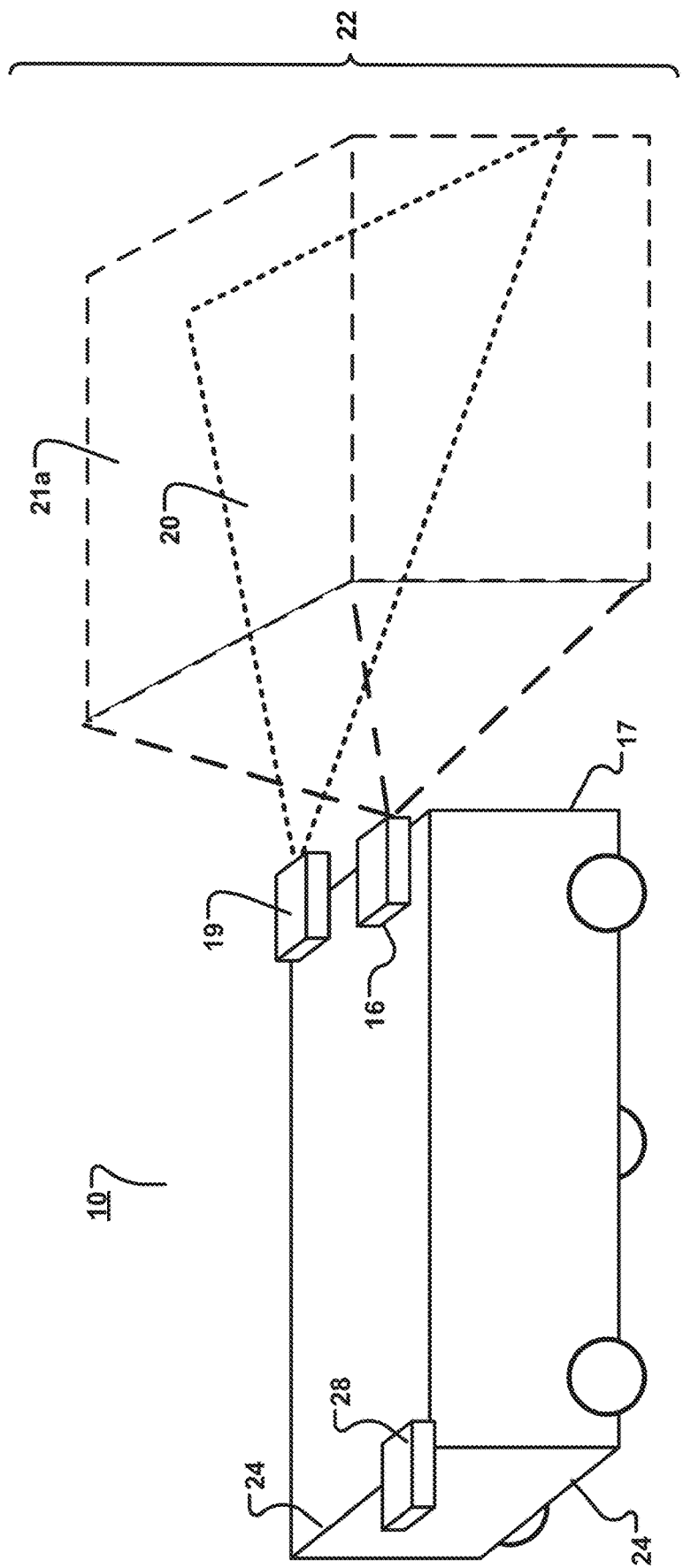
FIG. 2 is a perspective view of the example autonomous device showing placement of sensors on the autonomous device.
Figure 3:
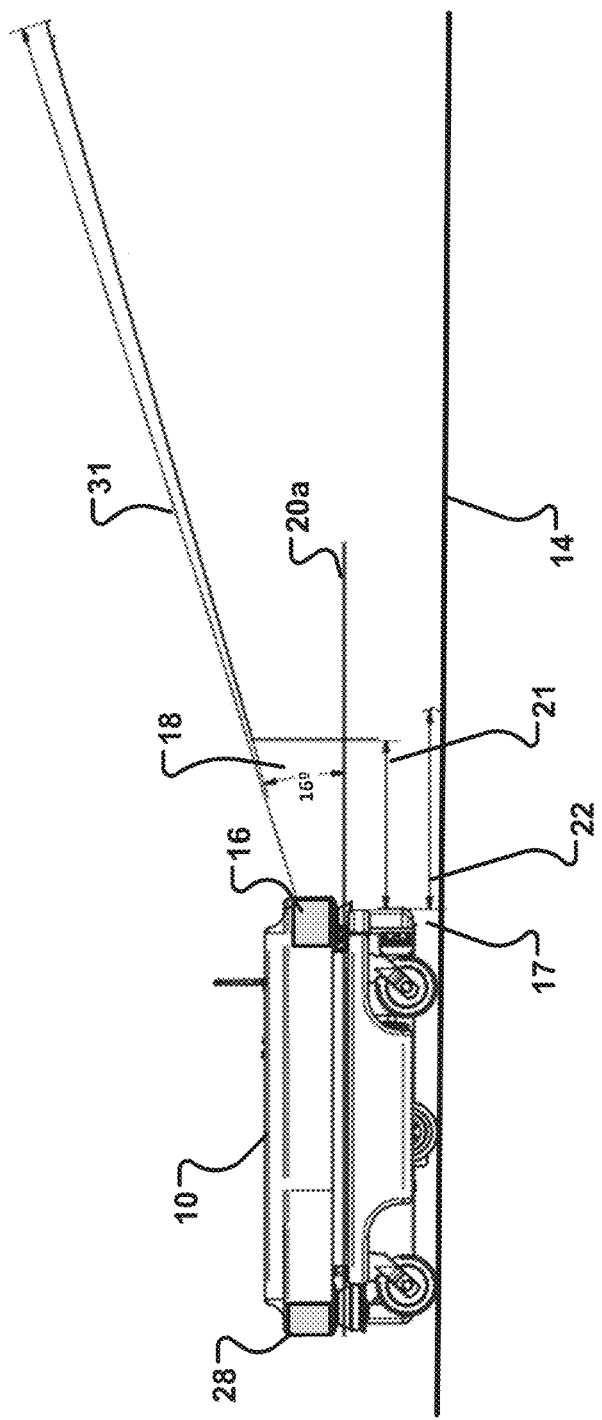
FIG. 3 is a side view of the example autonomous device.
Figure 4:
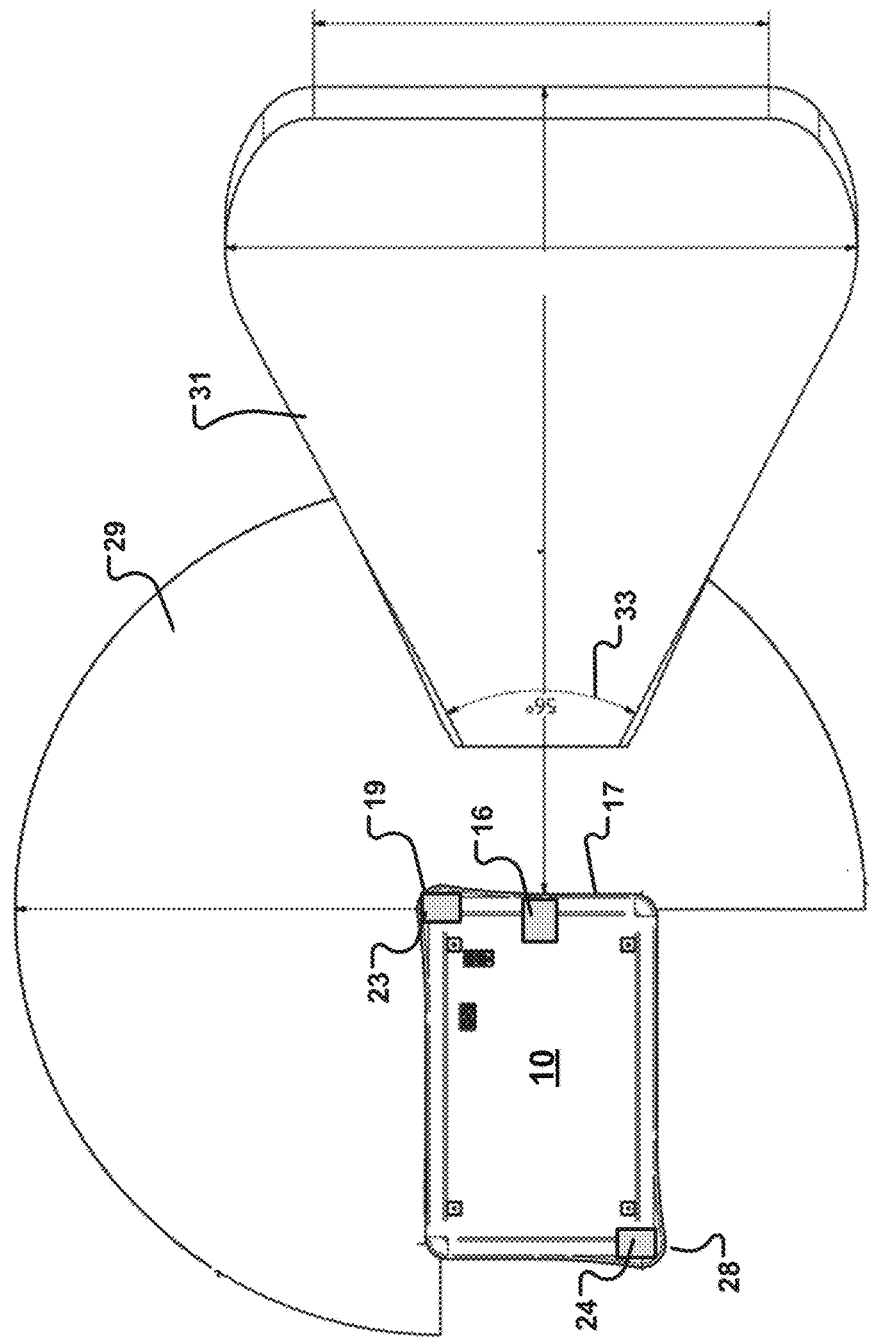
FIG. 4 is a top view of the example autonomous device.
Figure 14:
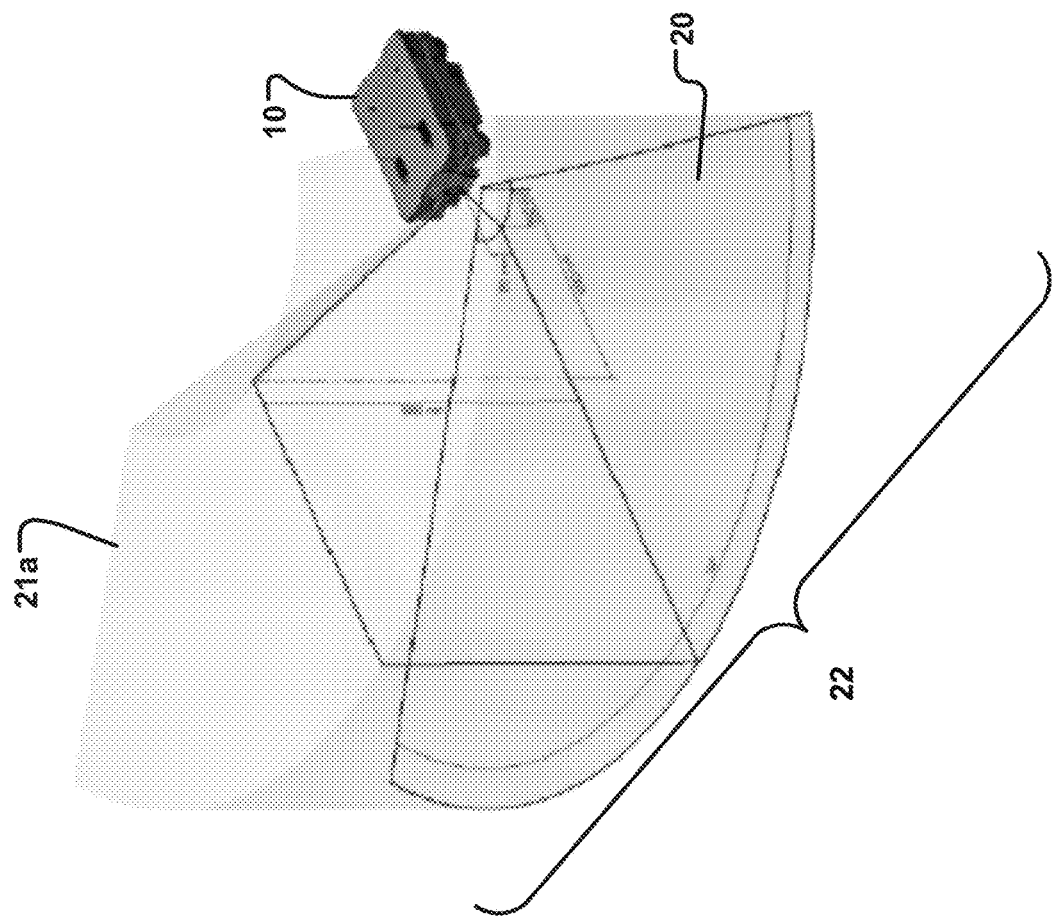
FIG. 14 is a perspective view of the example autonomous device showing a two-dimensional scanning plane for detection within a three-dimensional volume.

Referring to FIGS. 2, 3, and 4, robot 10 includes 3D camera 16 at a front 17 of the robot. In this example, the front of the robot faces the direction of travel of the robot. The back of the robot faces terrain that the robot has already traversed. Robot 10 also includes LIDAR scanner 19 at its front. The LIDAR scanner produces a laser beam that rotates through an arc 29 (e.g. over 270°. FIG. 4) at the front the autonomous device in order to detect objects in a 20 plane produced through rotation of the laser beam. Since the LIDAR scanner 17 produces a one-dimensional laser beam that moves in two dimensions, the LIDAR scanner will detect objects at least in plane 20 (FIG. 2) in the space that the robot is controlled to traverse. Since the camera 16 is 3D, the camera will detect objects in 3D volume 21a (FIG. 2) in the space that the robot is controlled to traverse. This concept is illustrated also in FIG. 14, which also shows examples of robot 10, LIDAR detection plane 20, and 3D volume 21a.

LIDAR scanner 19 is adjacent to, and points in part of the same general direction as, 3D camera 16. Likewise, 3D camera 16 is adjacent to, and points in part of the same general direction as, LIDAR scanner 19. For example, the LIDAR scanner may be alongside the 3D camera or the 3D camera may be alongside the LIDAR scanner as shown in the examples of FIGS. 2 and 4. In this configuration, both the 3D camera and the LIDAR scanner are configured to view at least part of a same region 22 (FIGS. 2 and 14) at least in front of the robot during travel. In order to detect the laser beam, the camera is configured to be sensitive within a light spectrum corresponding to the applied LIDAR scanner. In this example, the LIDAR scanner send out laser light within the infrared spectrum for navigation and object detection. Accordingly a 3D camera is able to detect and to capture infrared light images in order to detect the laser beam. The camera will thus detect the laser beam from the LIDAR scanner located in region 22, as described below. The front of the robot may contain multiple 3D camera/LIDAR scanner combinations although only one is shown.

Figure 5:
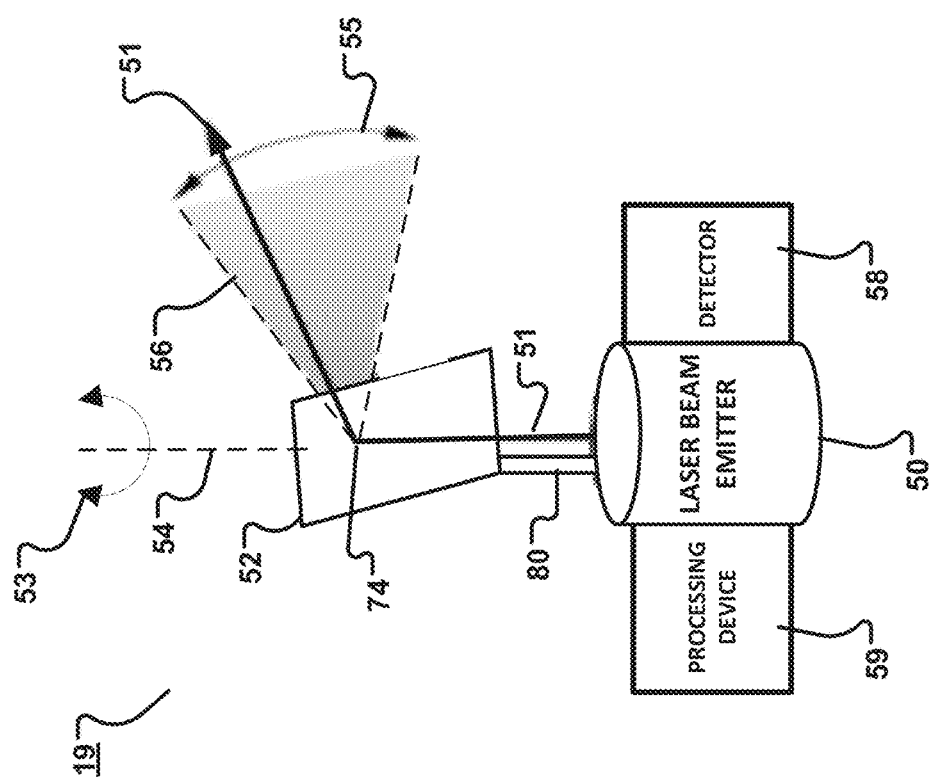
FIG. 5 is a block diagram of an example laser-based scanner that may be incorporated into the example autonomous device.

Referring to FIG. 5, example LIDAR scanner 19 includes a laser beam emitter 50 to output a laser beam 51 and a rotatable mirror 52 that rotates in the directions of arrows 53 about axis 54 to direct the laser beam outwardly from the LIDAR scanner. LIDAR scanner 19 operates by controlling the emitter to output the laser beam at the rotatable mirror. The LIDAR scanner controls the rotatable mirror to rotate, which causes the laser beam to output toward, and to scan across, a target in the directions of arrows 55 within range 56. Range 56 may include a 2D plane, such as plane 20 of FIGS. 2 and 14, The laser beam reflects back from the target to a detector 58 on the LIDAR scanner. The time it takes for the laser beam to reach the target and for the reflection to reach back to the detector on the LIDAR scanner is provided to a processing device—either in the robot's control system or in the scanner itself (e.g., processing device 59)—which uses that time to determine the distance to the target.

Robot 10 may also include a 3D camera and/or LIDAR scanner 28 at its back 24 as shown in FIGS. 2, 3, and 4. Robot 10 may also include one or more 3D camera/LIDAR scanner combinations (not shown) on its sides. Each 3D camera/LIDAR scanner may be configured to view part of a same region.

Referring to FIGS. 3 and 4, 3D camera 16 has a FOV 18 in the range 16° below the horizontal plane 20a to 16° above the horizontal plane 20a in this example. In this example, the placement of 3D camera 16 is such that there is about a 350 millimeter (mm) range 21 before the 3D camera can detect an object proximate to the robot, and about a 410 mm range 22 before the camera can detect the surface 14 on which it is traveling. In this example, the 3D camera has a sensing range 31 of about 1.9 meters (m) and can see at least 750 mm above surface 14, The numerical values presented here and elsewhere in this specification are examples only, are specific to an instance of an example robot described herein, and are not intended to limit the scope of the claims made herefrom or the operations of the processes described herein.

One or more 2D cameras may be used instead of, or in addition to, a 3D camera on robot 10. For example, for all instances described herein, one or more 2D cameras may be substituted for a 3D camera. To obtain 3D data of a region, two or more 2D cameras may be pointed at the same region and the captured 2D data correlated to obtain 3D data. In the example above, one or more 2D cameras and the LIDAR scanner may be configured to view at least part of a same region 22 in front of the robot during travel. Likewise, 2D cameras may be at the back or sides of the robot. Laser-based scanners other than LIDAR may be used for the purposes described herein. The top view shown in FIG. 4 shows LIDAR scanners 19 and 28 located at front corner 23 and back corner 24, respectively. In this example, LIDAR scanner 19 has a scanning range 29 of about 7 meters (m) to 11 m or 20 m over an arc of about 270°. In some implementations, LIDAR scanner 19 has a scanning range 29 of about 12 m over an arc of about 270°. LIDAR scanner 28 may have the same range(s). In this example, a range 31 of 3D camera 16 is about 1.9 m over an arc 33 of about 56°. As previously explained, the numerical values presented here and elsewhere in this specification are examples only, are specific to an instance of an example robot described herein, and are not intended to limit the scope of the claims made herefrom or the operations of the processes described herein.

The LIDAR scanners, the 3D (or other) cameras, and/or any short-range sensors constitute a vision system for the robot. In some implementations, a control system 40 (FIG. 1) stores, in computer memory, a map of a space in which the robot travels. The map may be located on the robot or at any location remote from the robot that is accessible to the control system. The map includes locations of landmarks, such as columns, corners, windows, poles, and other distinguishable features of the space that act as references for the robot. The map also may also include measurements indicating the size of the space, measurements indicating the size and locations of the landmarks, measurements indicating distances between landmarks, and coordinate information identifying where the landmarks are located in the space. The control system may use visual data from the vision system and data from the map to navigate throughout the space during operation.

The vision system may be configured to continuously detect distances between the robot and visible objects in a vicinity of the robot. This may be done in order to avoid, or attempt to avoid, collision and to guide the robot safely around or between visible objects along a route or bring the robot to an immediate stop if an object is detected within a predefined safety zone around the robot. For example, while the robot is moving along a route, an on-board computing system may continuously receive input from the LIDAR scanner. If an obstacle within the line-of-sight of the LIDAR scanner is blocking the trajectory of the robot, the on-board computing system may plan a path around the obstacle and/or take other actions to reduce the chances of collision, as described herein. If an obstacle within the line-of-sight of the LIDAR scanner is predicted to block the trajectory of the robot, the on-board computing system may plan a path around the obstacle and/or take other actions to reduce the chances of collision, as described herein. In some implementation, an on-board controller or control system sends information to a remote computing system and the remote computing system may instruct the robot on where to move to avoid a collision. This type of remote control may be implemented, for example, using signals that have 5G speeds.

In the example of FIG. 1, control system 40 includes on-board components 32 and remote components 38. In this regard, control system 40 (FIG. 1) may include circuitry and/or an on-board computing system 34 to control operations of the robot. The circuitry or on-board computing system is "on-board" in the sense that it is located on the robot itself. The control system may include, for example, one or more microcontrollers, one or more microprocessors, programmable logic such as a field-programmable gate array (FPGA), one or more application-specific integrated circuits (ASICs), solid state circuitry, or any appropriate combination of two or more of these types of processing devices. The control system may include, or be in communication with, a processing device (e.g., 59, FIG. 5) that is part each LIDAR scanner. In some implementations, on-board components of the control system may communicate with a remote computing system 39. This computing system is remote in the sense that it is not located on the robot itself. For example, the control system can also include computing resources distributed to a remote—for example, a centralized or cloud—service, at least a portion of which is not on-board the robot. Commands provide by the remote computing system may be transferred for execution by an on-board computing system. In some implementations, the control system includes only on-board components. In some implementations, the control system includes a combination of on-board components and the remote computing system. In some implementations, the control system may be configured—for example programmed—to implement control functions and robot movement absent either local or remote input from a user. In some implementations, the control system may be configured to implement control functions, including localization, based at least in part on input from a user.

The remote control system may include a fleet management system. The fleet management system may include one or more computing devices that operate together to control, to influence, or to instruct multiple robots and/or other objects within a space. For example, the fleet management system may be configured to coordinate operations of multiple robots, including instructing movement of a robot to a point within the space and to perform operations at that point. In some implementations, the fleet management system may store, maintain, and update a map of the space in which the robot or robots are to operate. The map may be accessed by each robot through the fleet management system or the map may be downloaded periodically, intermittently, or sporadically to all or some robots operating in the space.

In some implementations, the fleet management system may store, maintain, and update information regarding errors detected in the robots' vision systems. For example, if an error, such as a misalignment, in a robot scanner is detected according to a process described herein, the fleet management system may record that error and control the affected robot to move to a safe location for repair and to reallocate its tasks to a different robot.

The control system, including the remote portions thereof, may be distributed among multiple robots operating in the space. For example, one of the robots may receive the map—for example, from a fleet controller—and distribute the map to robots operating locally within the space. Similarly, one or more robots within the space may send command and control signals to other robots.

In some implementations, the control system may be predominantly remote from the robot, with the on-board components of the control system including limited processing capabilities. In some examples, the on-board components of the robot's control system may be configured to receive inputs from the remote components of the control system and to control the robot to react to the those inputs.

The control system may include a safety system or the safety system may be separate from the control system. The safety system may include LIDAR scanner 19 or any other laser-based scanner used to detect objects in a 2D plane relative to the robot. This scanner, such as LIDAR scanner 19, is referred to as the "safety scanner". The control features of the safety system may be implemented on the robot or on both the robot and the remote computing system. In cases where the control features of the safety system are implemented partly on the remote computing system, the remote computing system may send control instructions to on-board computing system 34 to implement safety protocols based, at least in part, on readings from the safety scanner. In cases where the control features of the safety system are implemented wholly on the on-board computing system, the on-board computing system controls operation of the robot based on reading from the safety scanner. For example, the safety scanner determines if another object is within a predefined range of—e.g., a distance from—the robot along its line of travel or if the robot is on a collision course with the other object. This may be done by measuring the time it takes for the laser beam from the safety scanner to reach and reflect from the other object. Based on the distance that the object is from the robot, the safety system may take precautionary measures, such as reducing the speed of the robot to a predefined speed or stopping until the perceived threat is reduced, e.g., the object is no longer within the predefined range. The safety system may also reduce the speed of the robot or take other action(s) if an error in the safety scanner is detected, for example, if the safety scanner is misaligned.

Example processes described herein use the safety scanner to identify objects of in a space traversed by an autonomous device. A camera is configured to capture an image of the object and to determine whether at least part of the safety scanner has an operational error—for example, the scanner's mirror and/or emitter are misaligned-based on the image. In this regard, as described below, the safety scanner may project a laser beam onto an object that it scans. Due to the speed at which the laser beam moves or scans across the object, the laser beam appears to the camera as a line across the object. Accordingly, the image that the camera captures includes the line produced by movement of the laser beam. The image that the camera captures of the line produced by movement of the laser beam also includes an image of the surface on which the robot is traveling. The robot's control system obtains information from the image at one or more than one locations and use the information to determine whether there is an error in the safety scanner. If there is an error in the safety scanner, the safety system may reduce the speed of the robot, cause the robot to move at the reduced speed to a location where the error can be addressed, or cause the robot to stop in place so that the error can be addressed where the robot stopped.

Figure 6:
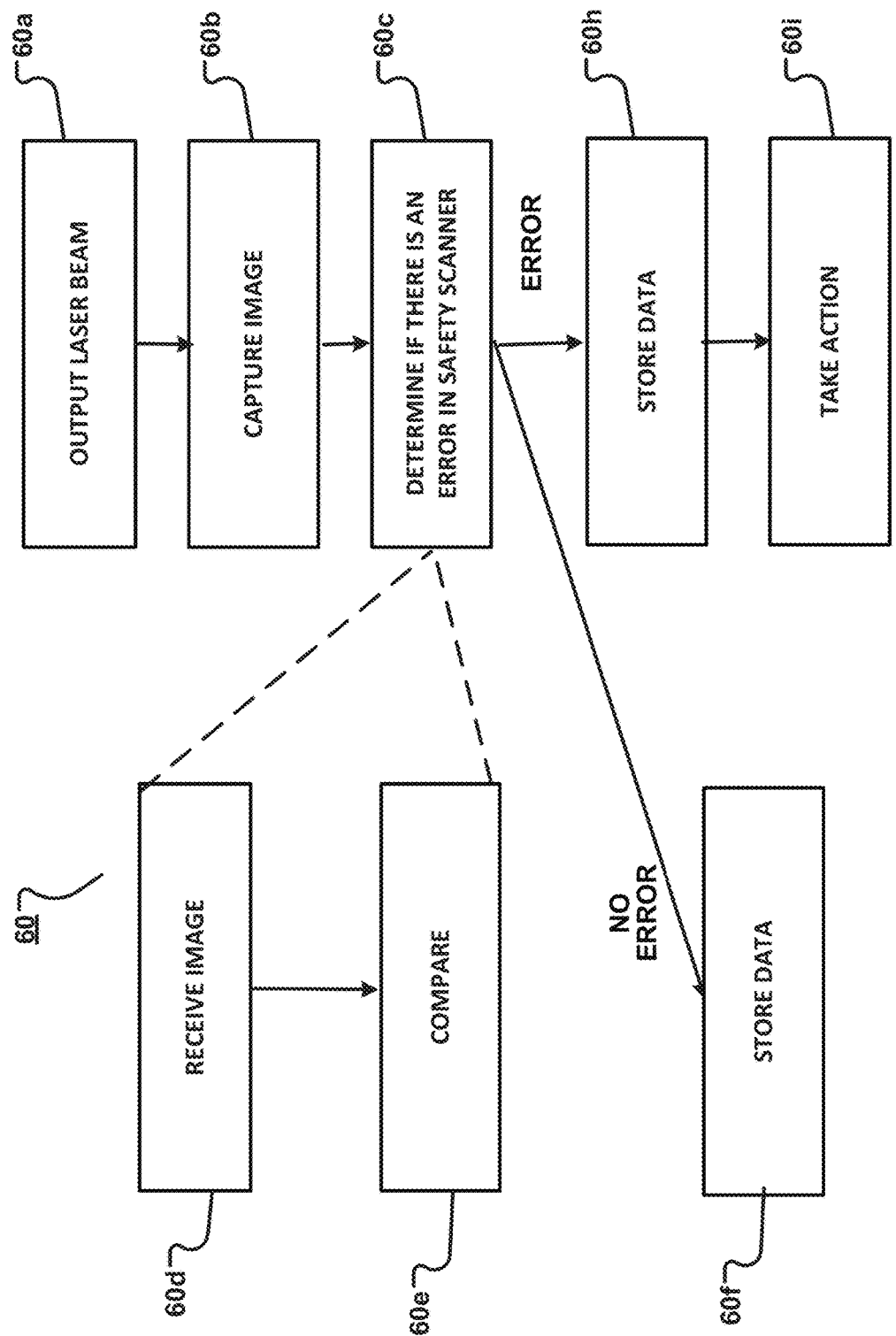
FIG. 6 is a flowchart showing an example process for detecting an error in the laser-based scanner on the example autonomous device.

Referring to FIG. 6, example process 60 includes using one or more cameras (e.g., camera 16) and the safety scanner (e.g., LIDAR scanner 19) that view a common region away from the robot to detect an error associated with the safety scanner. Example process 60 detects the error using one or more images obtained from a single, same location. This is in contrast to example process 70 described below that detects the error using two or more images captured from two or more different locations.

According to process 60, the safety scanner is controlled to output (60*a*) a laser beam in a plane towards an object. As described previously, in a case where the safety scanner is a LIDAR system, a laser beam emitter directs a laser beam toward a rotatable mirror. The rotatable mirror is configured to rotate in two dimensions to direct the laser beam in a plane across the object. For example, in FIG. 7 LIDAR scanner 19 outputs its laser beam (e.g., an infrared laser beam) in plane 61. The plane intersects wall 62 (the object), as show in in FIG. 7. Due to the speed of rotation of the mirror, the intersection of the laser beam and the object appears to create a line 63 across the object. That is, the intersection of the laser beam and wall 62 creates a line 63 across the wall, which can be captured by camera 16 (e.g., an infrared camera) as described herein. The line may be continuous or dashed.

Figure 7:
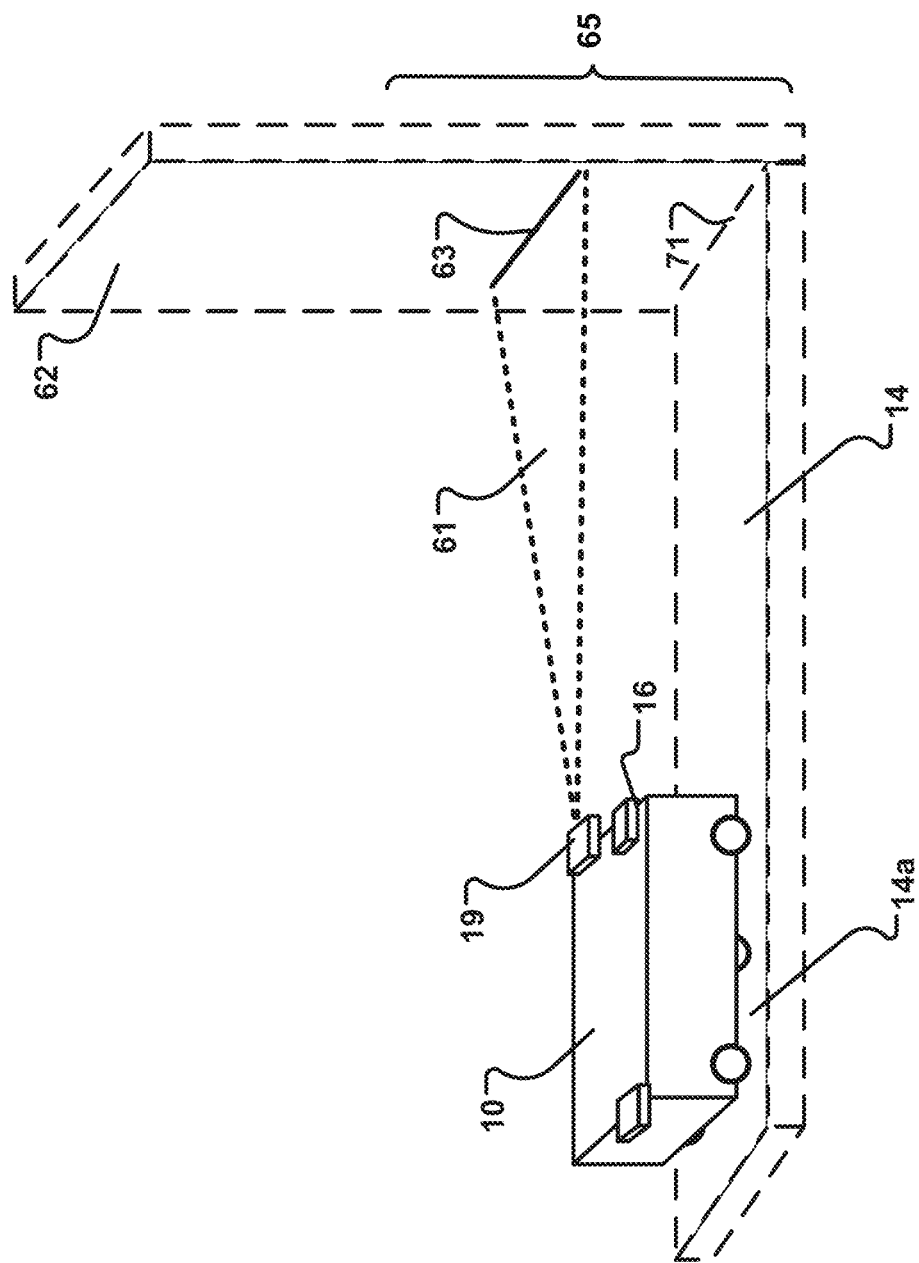
FIG. 7 is a perspective view of an the example autonomous device directing a laser beam from the lased-based scanner to an object.
Figure 8:
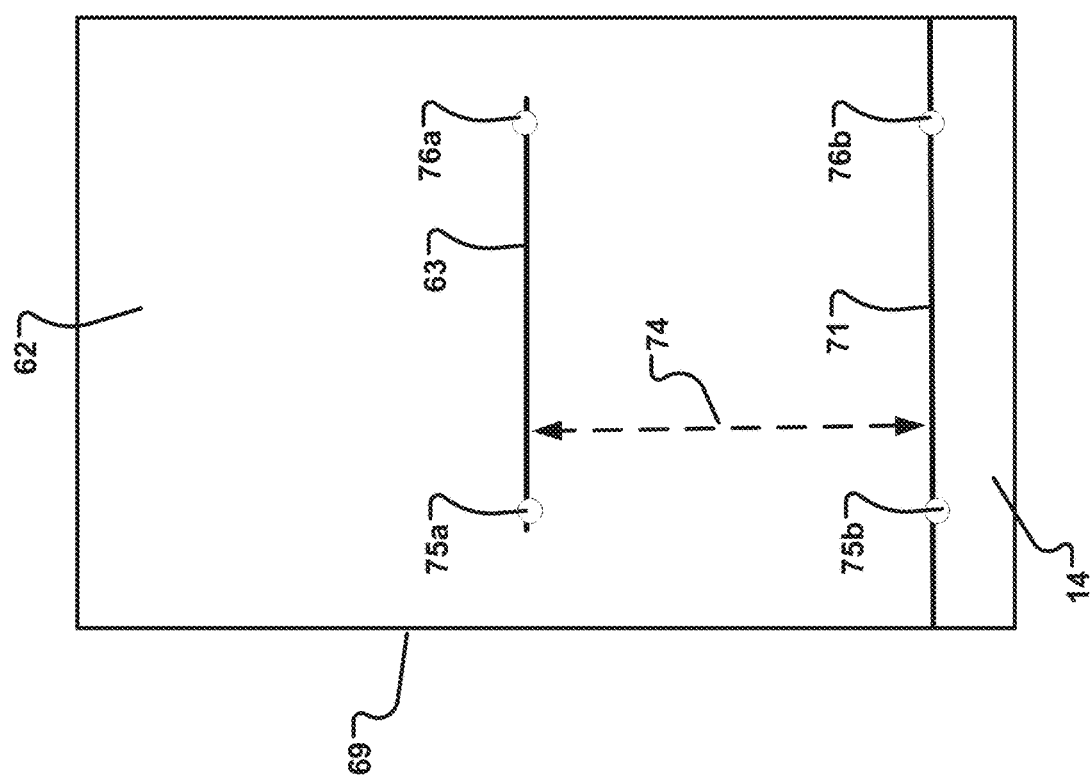
FIG. 8 is a block diagram of an example image captured by a camera on the example autonomous device that includes the laser beam.

As explained with respect to FIGS. 2 to 4, camera 16 is mounted on the robot's body to face a direction that the safety scanner (e.g., LIDAR scanner 19) scans. In the example of FIG. 7, the camera captures (60*b*) an image of a region 65 in which the laser beam output by the safety scanner intersects the object. As show in FIG. 8, the resulting captured image 69 includes line 63 where the laser beam intersects the object. That is, image 69 includes line 63 across wall 62 where the laser beam intersects the wall. The image 69 captured by the camera (that is, the same image) also includes an image of the surface 14 on which the robot is traveling. In particular, the image includes an image of the intersection 71 (FIG. 7) of that surface and the object. In the example of FIG. 8, image 69 includes line 71 representing the intersection of wall 62 and surface 14.

The control systems uses the information in the image, such as image 69 (FIG. 8), to determine (60*c*, FIG. 6) whether at least part of the safety scanner is operating erroneously and, therefore, there is a problem such as misalignment of the scanner. For example, misalignment may occur when the emitter does not point the laser beam at a correct spot, such as spot 74 of mirror 52 in FIG. 5. For example, misalignment may occur when the mirror is offset from its intended position on the robot. For example, misalignment may occur if both the emitter and mirror, or the entire safety scanner, has been offset from its intended position on the robot, There may also be other reasons for misalignment not expressed herein.

Referring back to FIG. 6, the control system receives (60*d*) the image from the safety scanner. The control system then analyzes the image to determine whether (i) the intersection of the laser beam and the object (e.g., line 63) and (ii) the intersection of the surface and the object (e.g., line 71) are consistently a predetermined distance apart or are consistently within some acceptable tolerance of the predetermined distance apart (e.g., 1% deviation, 2% deviation, 3% deviation, 4% deviation, and so forth). The control system may perform image recognition processes to identify lines 63 and 71, for example. The control system may use the distance between the object and the robot to scale any distances and/or features shown in the image 69 to real-world dimensions. The control system compares (60*e*) the distance between the surface and the intersection of the laser beam and the object—for example, the distance 74 between lines 63 and 70 (FIG. 8). This comparison is made for at least two points along each of lines 63 (points 75*a*, 76*a*) and 71 (points 75*b*, 76*b*) at a perpendicular to line 71. For example, the comparison may be made for the beginning and at the end of each of line 63 and 71. In some implementations, this comparison may be made at multiple points along each of lines 63 and 71—for example, every millimeter, every centimeter, every decimeter, and so forth.

The control system may also confirm that the intersection of the laser beam and the object (e.g., line 63) is consistently at least a predetermined distance from the floor (surface 14)—referred to as the safety level. In this regard, the safety scanner is configured so that its laser beam intersects objects at a height that is at least at the safety level. If line 63 is below the safety level, then the control system determines that there is an error in the safety scanner that requires correction. As explained above, the height of the laser beam above the surface is determined based, in part, on the distance between the object and the robot that is detected using the safety scanner. Accordingly, the distance between the object and the robot may be used to scale the distances shown in the image 69 to a real-world distance in order to determine whether line 63 is above the safety level.

If there are no errors in the safety scanner—for example, the emitter and the mirror are aligned—there should be little or no difference at any two or more points in the distance between lines 63 and 71. For example, the distance between lines 63 and 71 should be substantially the same throughout their entire length and that distance should be greater than the safely level, with minor deviations defined to be within an acceptable tolerance. The control system may be programmed to discount minor deviations such as those described above as small irregularities in the flatness of the surface.

The control system determines that there is an error in the safety scanner—for example, the emitter and the mirror are not aligned—if the distance between lines 63 and 71 changes by more than an acceptable amount at different points along the lines 63, 71 and/or if line 63 is below the safety level.

If the control system determines (60*c*) that there are no errors in the safety scanner, then data indicating no errors may be stored (60*f*) as described below and robot operation may continue uninterrupted. If the control system determines (60*c*) that there is an error in the operation of the safety scanner, the control system may store data (60*h*) as described below and take action (60*i*) to reduce the chances that the error will cause damage to the robot or to the surroundings. For example, the control system may be configured to change a speed of movement of the robot in response to determining that at least part of the safety scanner is misaligned. For example, the control system may be configured to reduce the speed of movement of the robot. In an example, the speed of movement may be reduced from 3 meters/second (m/s) to 0.3 m/s or less. For example, the control system may be configured to change the direction of motion of the robot at the reduced speed. In this example, the control system may direct the robot to move to a repair area where the safety scanner can be checked and repaired. For example, the control system may be configured to stop movement of the body in response to determining that the at least part of the safety scanner is misaligned. In this example, the robot may simply stop in place and a technician may go to the location of the robot to implement repairs. In some implementations, the robot may be controlled to provide audio or visual indications, such as flashing lights or alarms, respectively, to indicate that an error has been detected.

In some implementations, the robot may include one or more actuators that are controllable to move at least part of the safety scanner to correct for misalignment of at least part of the safety scanner. The actuators may be used to correct misalignment of the whole scanner assembly. Adjustments within a safety scanner also may be made and supervised by qualified personal. In an example, as shown in FIG. 5, one or more actuators 80 may be configured, and controllable by the control system, to move mirror 52. Actuator(s) 80 may be configured to change the angle of mirror 52, the vertical or horizontal location of mirror 52 relative to emitter 50, or some other positional parameter of the mirror. As shown in FIG. 5, actuator(s) 80 may be configured, and controllable by the control system, to move emitter 50. Actuator(s) may be configured to change the angle of emitter 50, the vertical or horizontal location of emitter 50 relative to mirror 52, or some other positional parameter of the emitter. Through control of the actuators, misalignments of the safety scanner may be corrected automatically.

Computer memory—for example, non-transitory machine-readable media—either on-board the robot or external to the robot may store data representing a configuration of the robot at a time of the misalignment, the time that the misalignment occurred, and whether the alignment was correctable automatically. This information may be stored by the computer memory in the control system. The fleet management system may access this computer memory to determine the status of the various robots in the fleet and reallocate resources—for example, robots to different tasks—based on which robots are operating properly and which robots are not.

In some implementations, if process 60 determines that there is an error in operation of scanner 19, process 60 may capture multiple images at the same location and repeat the analyses of operations 60*d* and 60*e* for each of those images. If the results for each image are consistent, the control system confirms that there is an error in the scanning system. If the results for different images continue to be inconsistent—for example, one image indicates an error and one does not—then the control system may move the robot to a different location and repeat the processes or execute process 70 that is described below.

Figure 9:
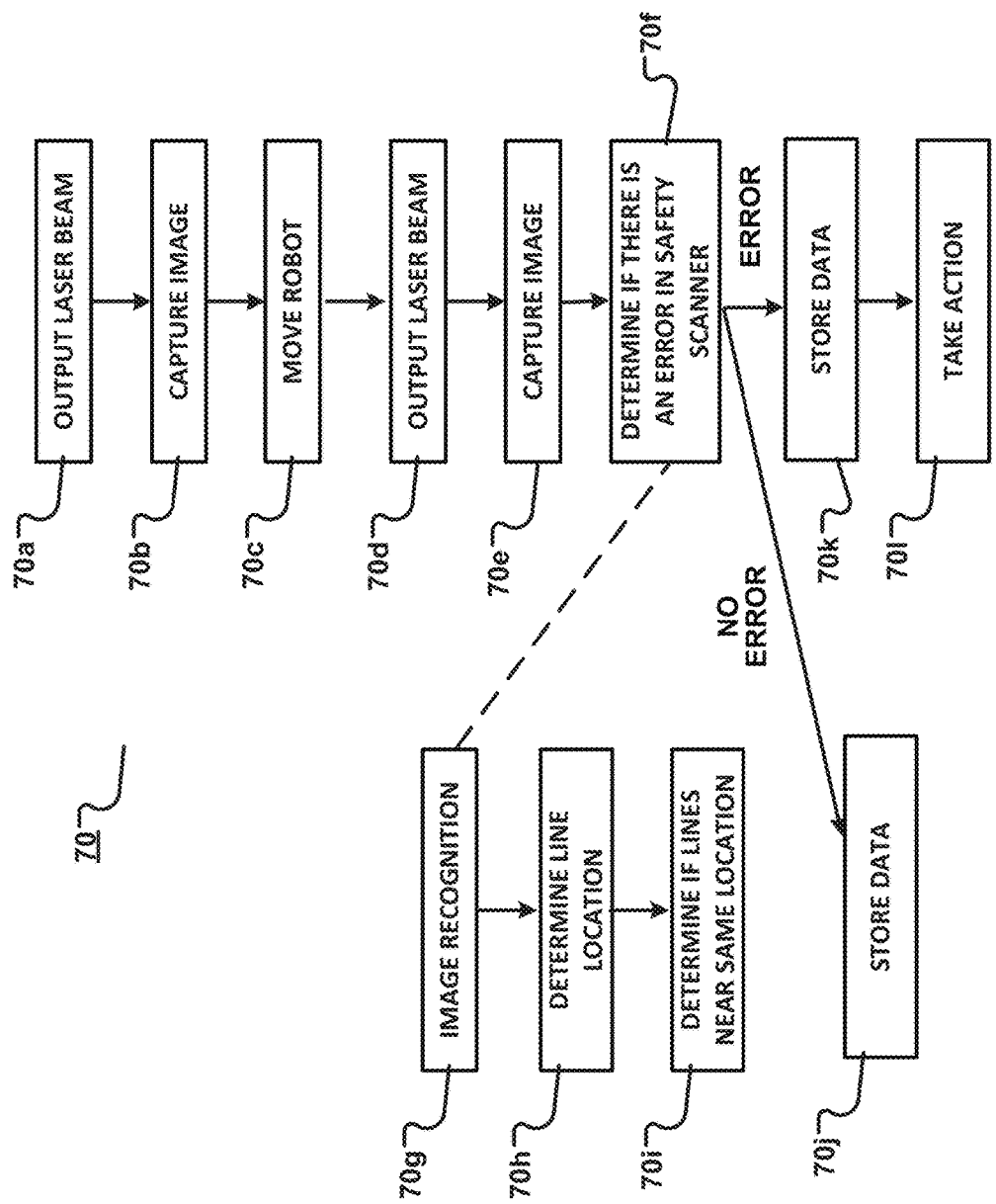
FIG. 9 is a flowchart showing an example process for detecting an error in the laser-based scanner on the example autonomous device.

In another example process 70 shown in FIG. 9, the camera(s) (e.g., 3D camera 16) may capture images at two or more locations of (i) the intersection of the laser beam from the safety scanner (e.g., LIDAR scanner 19) and the object and (ii) the intersection of the surface and the object. For example, the camera may capture images of lines 63 and 71 at the location 14*a* of robot 10 in FIG. 7 and of lines 63*a* and 71 at the location 14*b* of robot 10 in FIG. 10. Locations 14*a* and 14*b* are different locations on surface 14 relative to wall 62, with location 41*b* being closer to wall 62 than location 14*a*. The control system uses the resulting images to determine if there is an error, such as a misalignment, with the safety scanner.

At first location 14*a*, the safety scanner is controlled to output (70*a*) a laser beam in a plane towards an object. As described previously, in a case where the safety scanner is a LIDAR system, a laser beam directs a laser beam toward a rotatable mirror. The rotatable mirror is configured to rotate in two dimensions to direct the laser beam in a plane across the object. The plane intersects the object at line 63 in FIG. 7, as described above with respect to process 60. Camera 16 captures (70*b*) an image of an area in which the laser beam output by the safety scanner intersects the object, as described with respect to process 60. The image may be image 69 of FIG. 8

Figure 10:
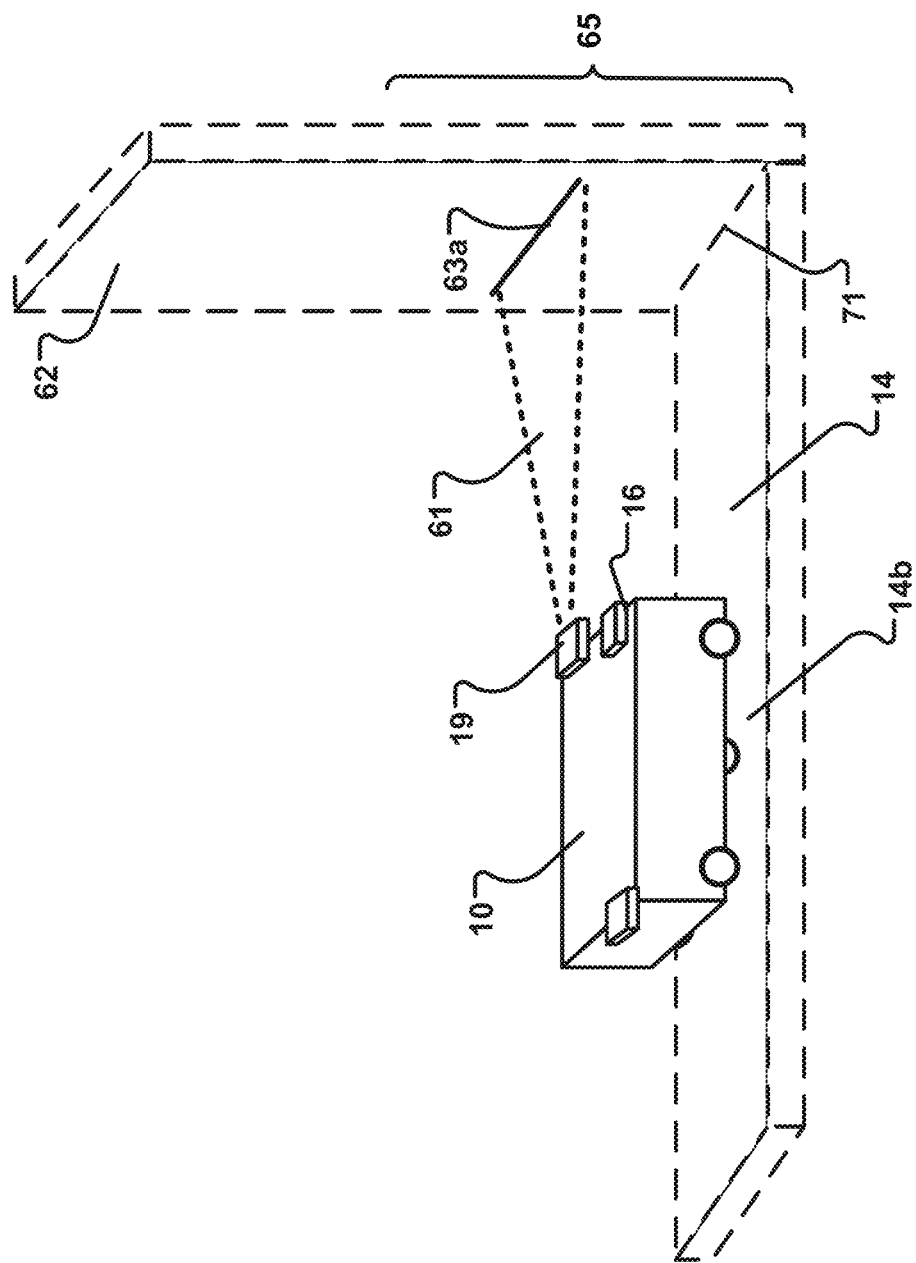
FIG. 10 is a perspective view of an the example autonomous device directing a laser beam from the lased-based scanner to an object.

The robot is controlled to move (70*c*) to a second location 14*b* relative to the object that is different than the first location. The difference between the first location and the second location may be, for example, on the order of centimeters, decimeters, or meters. The first and second locations may be along a same line that is perpendicular or substantially perpendicular to the object as shown in FIGS. 7 and 10, in which case the robot is at the same angle relative to the object in both locations. The first and second locations may be at locations along different lines that are at different angles relative to the object (not shown).

Figure 11:
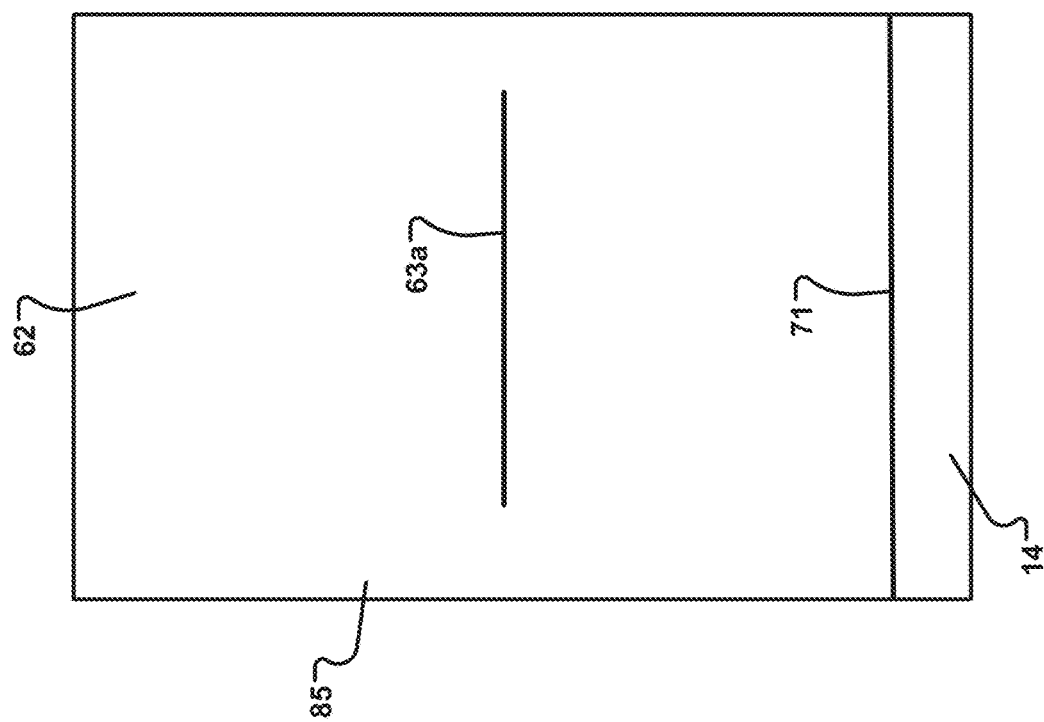
FIG. 11 is a block diagram of an example image captured by a camera on the example autonomous device that includes the laser beam.

At the second location 14 shown in FIG. 10, the safety scanner is controlled to output (70*d*) a laser beam in a plane towards an object. As described previously, in a case where the safety scanner is a LIDAR system, a laser beam emitter directs a laser beam toward a rotatable mirror. The rotatable mirror is configured to rotate in two dimensions to direct the laser beam in a plane across the object. The plane intersects the object as a line 63*a* shown in FIG. 10. The camera captures (70*e*) an image like that of FIG. 8, which contains an image of line 63*a* and an image of line 71 An example of this image is image 85 shown in FIG. 11.

The control system uses images 69 and 85 to determine (7) (70*f*) whether at least part of the safety scanner is operating erroneously and, therefore, there is a problem such as misalignment of the scanner. For example, the control system receives the two images. The control system then analyzes images 69 and 85 to determine whether (i) the intersection of the laser beam and the object (e.g., line 63, FIG. 8) and (ii) the intersection of the laser beam and the object (e.g., line 63*a*, FIG. 11) are at the same location on the object or within a predetermined acceptable tolerance of that same location (e.g., 1% deviation, 2% deviation, 3% deviation, 4% deviation, and so forth).

In this regard, the control system may perform image recognition on each of images 69 and 85 and execute operations as described above with respect to FIG. 6 to identify the real-world locations of lines 63 and 63*a*. The operations executed to identify the location of each line 63, 63*a* are the same. Accordingly, those operations are described only with respect to image 63. The control system may perform image recognition (70*g*) to identify line 63 and line 71 where the surface 14 on which the robot is located intersects the object, such as wall 62. The control system obtains, from the safety scanner, the distance between the robot and the object. This distance is used to determine the location (70*h*)—e.g., the real world distance 74 of line 63 above line 71. For example, the height of line 63 above line 71 may be determined based on the image and then a predefined scaling factor that is based the distance that the camera was from the object when it captured the image may be applied to that height to determine the real world height of line 63 above line 71.

Figure 12A:
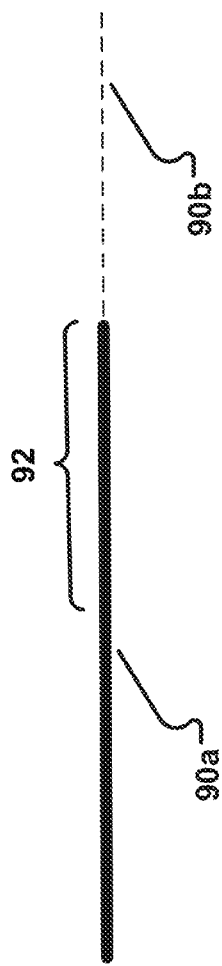
FIGS. 12A and 12B show examples of lines produced by laser beams.
Figure 12B:
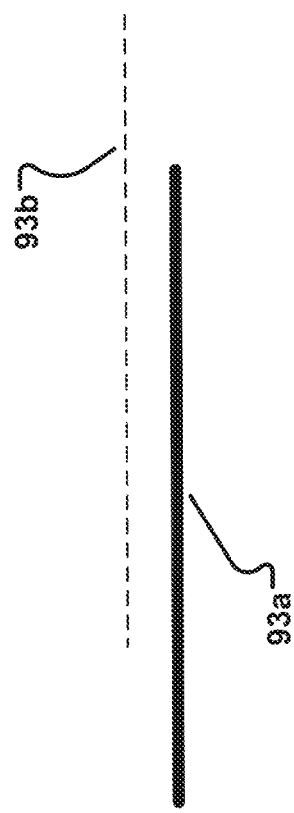

The control system determines (70*h*) the real-world locations of lines 63 and 63*a* from, respectively, image 69 captured at first location 14*a* and image 85 captured at second location 14*b*. After making that determination, the control system determines (70*i*) whether lines 63 and 63*a* are at or acceptably near the same location on the object. For example, the control system may determine whether lines 63 and 63*a* consistently overlap in whole or in part or are parallel but within a predefined acceptable distance of each other (e.g., on the order of single-digit centimeters, millimeters or fractions thereof). In an example, two lines overlap if they occupy the same space over a distance rather than just at point(s) of intersection. FIG. 12A shows an example where lines 90*a* and 90*b* having different weights/thicknesses overlap in part in region 92; and FIG. 12B shows an example where lines 93*a* and 93*b* are parallel but within a predefined acceptable distance of each other (in this example, 1 millimeter (mm)). In the examples presented herein, lines of different thicknesses and/or dashes are shown to differentiate the two clearly. In real-world cases, the lines will likely have same thickness and style. If there are no errors in the safety scanner—for example, the emitter and the mirror are aligned—lines 63 and 63*a* are at or near the same location on the object, for example, they overlap at least in part as in FIG. 12A or are parallel as in FIG. 12B and within a predefined acceptable distance of each other. In this case, the control system stores data (70*j*) but does not alter operation of the robot.

Figure 13A:
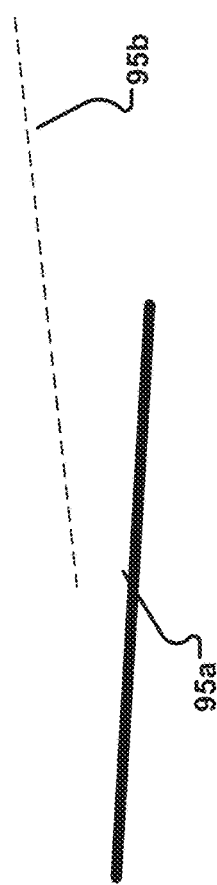
FIGS. 13A, 13B, and 13C show examples of lines produced by laser beams.
Figure 13B:
Figure 13C:
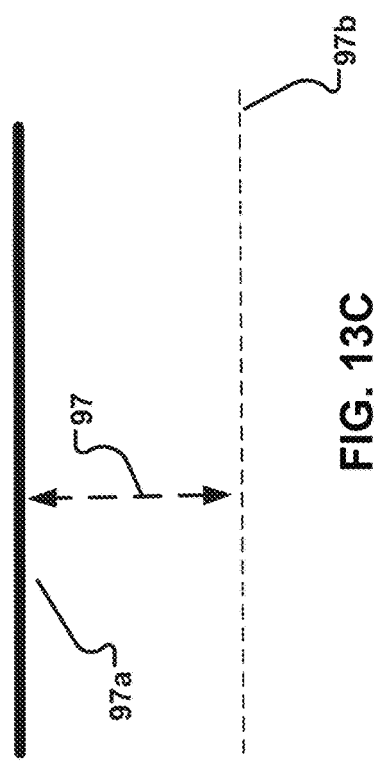

If lines 63 and 63*a* do not meet the criteria described above, the control system determines that there is an error, such as misalignment, in the safety scanner. FIG. 13A shows an example of two lines 95*a* and 95*b* at different angles, indicating an error in the safety scanner. FIG. 13*b* shows a case in which the two lines 96*a* and 96*b* intersect, indicating an error in the safety scanner. Note that in some cases, intersecting lines may be within an acceptable tolerance and, therefore not be indicative of an error in the safety scanner, FIG. 13C shows a case in which the two parallel lines 97*a* and 97*b* are separated by a distance 97 that exceeds a predetermined acceptable tolerance, indicating an error in the safety scanner. In FIGS. 13A to 13C, each pair of lines either do not overlap (e.g., occupy at least part of the same space for a distance) or has some other defect that indicates that there is an error in the safety scanner. An error may also be detected if either or both lines is below the safety level.

In some implementations, a scanning plane that is not horizontal is detected by the camera (e.g., line 95*b* of FIG. 13A). A non-horizontal scanning plane may be indicative of an error in the safety scanner, a misalignment of the scanner assembly, a mechanical defect or deformation of the robot chassis or wheels, or an uneven floor surface, for example. If the scanning plane, for any reason, is not horizontal, the safety and performance of the scanner may be compromised. Thus, if a non horizontal scanning plane is detected, the system can be configured to initiate one or several safety mitigation actions, such as speed reduction, stopping, self-checks, and/or calls for service personal. Some misalignments can be adjusted using adjustment screws. In an example, the system can be configured to automatically adjust some misalignment using actuators as described herein.

In some implementations, the robot may include an accelerometer (ACCEL) 99 (FIG. 1) that is in communication with the control system. The accelerometer may be configured to determine whether all or part of the surface is at an incline or to provide data to the control system for the control system to determine whether the surface is at an incline. If it is determined that the surface is at an incline, the control system may determine the incline, calculate the effect of the incline on the location of line 63 and/or 63a on the object, and correct the location of lines 63 and/or 63a based on the incline(s). For example, if location 14a is not at an incline and location 14b is at an incline, the incline of 14b may be determined and discounted in process 70. Note that both lines are at the same inclination, corrections may still need to be made to ensure accurate determination that the line or lines is/are above the safety level. The same or similar operations may be performed for a surface that is uneven. For example the control system may determine exactly how the floor is uneven, calculate the effects of the unevenness on the location of line 63 and/or 63a on the object, and correct the location of lines 63 and/or 63a based on the those effects The control system may also confirm that lines 63 and 63a are consistently at least a predetermined distance above the floor 14; that is at or above the safety level. If one or both of lines 63 and 63a is below the safety level, then the control system determines that there is an error in the safety scanner that requires correction.

The control system may also determine the amount of misalignment in some implementations. For example, the amount and/or angles at which the intersection of the object moved between the two images—that is lines 63 and 63a—can be used to determine the amount of misalignment. For example, a change in location and/or angle from line 63 at first location 14a to line 63a at second location 14b may be indicative of, and may be usable to calculate, the amount that the safety scanner is misaligned. For example, if line 63a is offset from line 71 by 3 degrees when compared to the relative locations of lines 63 and 71, the misalignment may be determined to be 3 degrees.

Referring back to FIG. 9, if the control system determines that there is an error in the operation of the safety scanner, the control system may store data (70k) and may take action (70l) to reduce the chances that the error will cause damage to the robot or to the surroundings. For example, the control system may be configured to change a speed of movement of the robot in response to determining that the at least part of the safety scanner is misaligned. As above, the control system may be configured to reduce the speed of movement of the robot. As above, the speed of movement may be reduced from 3 m/s to 0.3 m/s or less. For example, the control system may be configured to configured to change the direction of motion of the robot at the reduced speed. In this example, the control system may direct the robot to move to a repair area where the safety scanner can be checked and repaired. For example, the control system may be configured to stop movement of the body in response to determining that the at least part of the safety scanner is misaligned. In this example, the robot may simply stop in place and a technician may go to the location of the robot to implement repairs. In some implementations, the robot may be controlled to provide audio or visual indications, such as flashing lights or alarms, respectively, to indicate that an error has been detected. The control system may call a technician for service.

The operations described with respect to process 70 use two images; however, more than two images captured at more than two different locations may be used to make the comparisons and determinations described above with respect to process 70

The control system may also control one or more actuator(s) 80 to correct for any misalignment of the mirror and/or emitter, as described above.

The computer memory—for example, non-transitory machine-readable media—either on-board the robot or external to the robot may store data representing a configuration of the autonomous vehicle at a time of misalignment, the time that the misalignment occurred, and whether the alignment was correctable automatically. This information may be stored by the computer memory in the control system. The fleet management system may access this computer memory to determine the status of the various robots in the fleet and reallocate resources—for example, robots to different tasks—based on which robots are operating properly and which robots are not.

Processes 60 and 70 may register an error if the intersection of the laser beam and the object (e.g., lines 63 and/or 63a) is curved. Curvature of these lines may indicate that the mirror is not operating correctly or has a structural defect. Curvature is detected using image recognition techniques on the captured images.

In some implementations, processes 60 and/or 70 can be adapted to perform several tests and calculate an undesired offset of the safety scanner relative to a horizontal plane or surface on which the robot is traveling. The system can be adapted to calculate any necessary calibration information based on such offsets. A user interface on a computing system may provide instructions to a maintenance person (or robot) to adjust one or more levelling screw(s) of a support arrangement of the safety scanner in specific directions and turns to compensate for the offset.

In some implementations, a first test according to process 60 or 70 can be executed as an end of line test, to verify that the LIDAR system is mounted and working correctly and to store a "fingerprint" of the specific robot and LIDAR system. A second test according to process 60 or 70 can be executed on site to verify that there have been no transport damages or impacts on the LIDAR adjustment and to verify that the site test results are comparable to the end of line test results. The results of these tests can be stored onboard the robot or on external or "cloud" computer memory. In some implementations, the robot system can be configured to perform LIDAR alignment testing according to process 60 or 70 on regular basis, and to store the test results.

In addition to detecting a problematic, misaligned or an otherwise malfunctioning LIDAR scanner, processes 60 or 70 also can be used to detect small deviations and operational tendencies in a LIDAR scanner. For example, the control system may track data from one or both of processes 60 or 70 over time to identify a trend in the LIDAR scanner's operation. For example, the data may indicate that the LIDAR scanner is moving in one direction toward, but has not yet reached, an erroneous misalignment. Based on this information, it is possible to act before the LIDAR scanner reaches critical misalignment or malfunctions altogether. The control system may also identify the root cause of a misalignment or malfunction as recent alignment changes can be compared to recent events, such as the robot running over an object, an object hitting the robot, or the robot colliding with an object. If an event coincides in time with a misalignment, the control system may correlate the two. The control system may also compare product data with later misalignment. In response, actions may be taken to improve the design of the robot. The control system may compare LIDAR alignments and changes thereof within a fleet of robots working on the same site in order to identify possible local causes for alignment changes, such as vibrations due to an uneven surface. This LIDAR scanners may then be calibrated to compensate for these local causes.

The example processes described herein may be used on devices including, but not limited to, small robots like robot 10, automated forklifts in an indoor or outdoor setting, or other self-driving vehicles. The example processes may be used with any appropriate type of autonomous device.

The example devices described herein may include, and the processes described herein may be implemented using, a control system comprised of one or more computer systems comprising hardware or a combination of hardware and software. For example, a device may include various controllers and/or processing devices located at various points in the system to control operation of its elements. A central computer may coordinate operation among the various controllers or processing devices. The central computer, controllers, and processing devices may execute various software routines to effect control and coordination of the various automated elements.

The example devices described herein can be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing at least part of the devices can be performed by one or more programmable processors executing one or more computer programs to perform the functions described herein. At least part of the devices can be implemented using special purpose logic circuitry, e.g., an FPGA (field programmable gate array) and/or an ASC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

In the description and claims, the adjectives "first", "second", and "third" do not designate priority or order. Unless otherwise indicated explicitly or by context, these adjectives are used solely to differentiate the elements that they modify.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A system comprising:
   a body comprising wheels to move along a surface;
   a laser-based scanner on the body to output laser beams in respective planes;
   a camera on the body to capture a first image of a first area in which a first laser beam of the laser beams output by the laser-based scanner intersects an object at a height above the surface, the first image representing at least part of the object and representing the first laser beam based on a first line produced by an intersection of a first plane of the first laser beam and the object; and
   one or more processing devices comprising one or more of the following: one or more microcontrollers, one or more microprocessors, programmable logic, one or more application-specific integrated circuits, or solid state circuitry;
   wherein the first image is captured at a first location of the body;
   wherein the one or more processing devices are configured to control the body to move to a second location that is different from the first location, the one or more processing devices being configured to control the laser-based scanner to output a second laser beam of the laser beams in a second plane, and to control the camera to capture a second image of the object, the second image representing at least part of the object and representing the second laser beam based on a second line produced by an intersection of the second plane of the second laser beam and the object at a height above the surface; and
   wherein the one or more processing devices are configured to determine whether at least part of the laser-based scanner is misaligned based on a difference between the first line and the second line;
   wherein determining whether the at least part of the laser-based scanner is misaligned comprises comparing the first line and the second line to determine whether the first line and the second line are at or acceptably near a same location;
   wherein determining whether the first line and the second line are at or acceptably near a same location comprises determining whether the first line overlaps the second line at least partially or whether the first line and the second line are within an acceptable distance of each other; and
   wherein the one or more processing devices are configured to determine that the at least part of the laser-based scanner is misaligned based on the first line not overlapping the second line at least partially or the first line and the second line not being within an acceptable distance of each other.

2. The system of claim 1, wherein the system comprises an autonomous vehicle;
   wherein the laser-based scanner comprises an emitter to provide the laser beams and a mirror to output each laser beam in a respective plane; and
   wherein the least part of the laser-based scanner that is misaligned comprises at least one of the emitter or the mirror.

3. The system of claim 1, wherein the one or more processing devices are configured to change a speed of movement of the body in response to determining that the at least part of the laser-based scanner is misaligned.

4. The system of claim 1, wherein the one or more processing devices are configured to reduce a speed of movement of the body in response to determining that the at least part of the laser-based scanner is misaligned.

5. The system of claim 1, wherein the one or more processing devices are configured to stop movement of the body in response to determining that the at least part of the laser-based scanner is misaligned.

6. The system of claim 1, further comprising:
one or more actuators that are controllable to move the at least part of the laser-based scanner to correct for misalignment of the at least part of the laser-based scanner.

7. The system of claim 1, further comprising:
non-transitory machine-readable memory storing data representing misalignment of the at least part of the laser-based scanner.

8. The system of claim 7, wherein the system comprises an autonomous vehicle; and
wherein the non-transitory machine-readable memory stores additional data representing a configuration of the autonomous vehicle at a time of the misalignment.

9. The system of claim 1, wherein the system is an autonomous vehicle; and
wherein the one or more processing devices are on the autonomous vehicle.

10. The system of claim 1, wherein the system comprises an autonomous vehicle; and
wherein the one or more processing devices are part of a computing system that is not on the autonomous vehicle but that is in communication with the autonomous vehicle.

11. The system of claim 1, wherein the first line and the second line are straight.

12. The system of claim 1, wherein the laser-based scanner comprises a two-dimensional (2D) light detection and ranging (LIDAR) scanner.

13. The system of claim 1, wherein one or more processing devices are configured to perform operations comprising:
scaling the first image to real-world dimensions based on a first distance between the body and the object to produce a first scaled image; and
scaling the second image to real-world dimensions based on a second distance between the body and the object to produce a second scaled image;
wherein determining that the at least part of the laser-based scanner is misaligned is based on the first scaled image and the second scaled image.

14. A system comprising:
a body comprising wheels to move along a surface;
a laser-based scanner on the body to output laser beams in respective planes;
a camera on the body to capture a first image of a first area in which a first laser beam of the laser beams output by the laser-based scanner intersects an object at a height above the surface, the first image representing at least part of the object and representing the first laser beam based on a first line produced by an intersection of a first plane of the first laser beam and the object; and
one or more processing devices comprising one or more of the following: one or more microcontrollers, one or more microprocessors, programmable logic, one or more application-specific integrated circuits, or solid state circuitry;
wherein the first image is captured at a first location of the body;
wherein the one or more processing devices are configured to control the body to move to a second location that is different from the first location, the one or more processing devices being configured to control the laser-based scanner to output a second laser beam of the laser beams in a second plane, and to control the camera to capture a second image of the object, the second image representing at least part of the object and representing the second laser beam based on a second line produced by an intersection of the second plane of the second laser beam and the object at a height above the surface; and
wherein the one or more processing devices are configured to determine whether at least part of the laser-based scanner is misaligned based on a difference between the first line and the second line;
wherein the one or more processing devices are configured to determine an amount of misalignment of the laser-based scanner based on at least one of a location or an orientation of the first line and the second line; and
wherein the one or more processing devices are configured to determine an amount of misalignment of the laser-based scanner also based on an incline of the surface.

15. The system of claim 14, further comprising:
an accelerometer to provide information about the incline of the surface.

16. A system comprising:
a body comprising wheels to move along a surface;
a laser-based scanner on the body to output laser beams in respective planes;
a camera on the body to capture a first image of a first area in which a first laser beam of the laser beams output by the laser-based scanner intersects an object at a height above the surface, the first image representing at least part of the object and representing the first laser beam based on a first line produced by an intersection of a first plane of the first laser beam and the object; and
one or more processing devices comprising one or more of the following: one or more microcontrollers, one or more microprocessors, programmable logic, one or more application-specific integrated circuits, or solid state circuitry;
wherein the first image is captured at a first location of the body;
wherein the one or more processing devices are configured to control the body to move to a second location that is different from the first location, the one or more processing devices being configured to control the laser-based scanner to output a second laser beam of the laser beams in a second plane, and to control the camera to capture a second image of the object, the second image representing at least part of the object and representing the second laser beam based on a second line produced by an intersection of the second plane of the second laser beam and the object at a height above the surface; and
wherein the one or more processing devices are configured to determine whether at least part of the laser-based scanner is misaligned based on a difference between the first line and the second line; and
wherein the one or more processing devices are configured to determine an incline of the surface based on at least the first image and the second image.

17. One or more non-transitory machine-readable storage media storing instructions that are executable by one or more processing devices to perform operations comprising:
controlling capture of a first image of a first area in which a first laser beam from a laser-based scanner intersects an object at a height above a surface, the first image representing at least part of the object and representing the first laser beam based on a first line produced by an intersection of a first plane of the first laser beam and the object, wherein controlling capture of the first image comprises controlling capture by a camera on a robotic body at a first location on the surface;
controlling the robotic body to move to a second location on the surface that is different from the first location;
controlling the laser-based scanner to output a second laser beam in a second plane while the robotic body is at the second location;
controlling capture by the camera of a second image of the object, the second image representing at least part of the object and representing the second laser beam based on a second line produced by an intersection of a second plane of the second laser beam and the object at a height above the surface;
determining whether at least part of the laser-based scanner is misaligned based on a difference between the first line and the second line; and
determining an incline of the surface based on at least the first image and the second image;
wherein the one or more processing devices comprises one or more of the following: one or more microcontrollers, one or more microprocessors, programmable logic, one or more application-specific integrated circuits, or solid state circuitry.

18. The one or more non-transitory machine-readable storage media of claim 17, wherein the robotic body comprises an autonomous vehicle;
wherein the laser-based scanner comprises an emitter to provide each laser beam and a mirror to output each laser beam in a respective plane; and
wherein the least part of the laser-based scanner that is misaligned comprises at least one of the emitter or the mirror.

19. The one or more non-transitory machine-readable storage media of claim 17, wherein the operations comprise:
scaling the first image to real-world dimensions based on a first distance between the robotic body and the object to produce a first scaled image; and
scaling the second image to real-world dimensions based on a second distance between the robotic body and the object to produce a second scaled image;
wherein determining whether at least part of the laser-based scanner is misaligned is based on a difference between the first scaled image and the second scaled image.

20. One or more non-transitory machine-readable storage media storing instructions that are executable by one or more processing devices to perform operations comprising:
controlling capture of a first image of a first area in which a first laser beam from a laser-based scanner intersects an object at a height above a surface, the first image representing at least part of the object and representing the first laser beam based on a first line produced by an intersection of a first plane of the first laser beam and the object, wherein controlling capture of the first image comprises controlling capture by a camera on a robotic body at a first location on the surface;
controlling the robotic body to move to a second location on the surface that is different from the first location;
controlling the laser-based scanner to output a second laser beam in a second plane while the robotic body is at the second location;
controlling capture by the camera of a second image of the object, the second image representing at least part of the object and representing the second laser beam based on a second line produced by an intersection of a second plane of the second laser beam and the object at a height above the surface;
determining whether at least part of the laser-based scanner is misaligned based on a difference between the first line and the second line;
wherein the one or more processing devices comprises one or more of the following: one or more microcontrollers, one or more microprocessors, programmable logic, one or more application-specific integrated circuits, or solid state circuitry;
wherein determining whether the at least part of the laser-based scanner is misaligned comprises comparing the first line and the second line to determine whether the first line and the second line are at or acceptably near a same location;
wherein determining whether the first line and the second line are at or acceptably near a same location comprises determining whether the first line overlaps the second line at least partially or whether the first line and the second line are within an acceptable distance of each other; and
wherein determining whether at least part of the laser-based scanner is misaligned comprises determining that the at least part of the laser-based scanner is misaligned based on the first line not overlapping the second line at least partially or the first line and the second line not being within an acceptable distance of each other.

21. One or more non-transitory machine-readable storage media storing instructions that are executable by one or more processing devices to perform operations comprising:
controlling capture of a first image of a first area in which a first laser beam from a laser-based scanner intersects an object at a height above a surface, the first image representing at least part of the object and representing the first laser beam based on a first line produced by an intersection of a first plane of the first laser beam and the object, wherein controlling capture of the first image comprises controlling capture by a camera on a robotic body at a first location on the surface;
controlling the robotic body to move to a second location on the surface that is different from the first location;
controlling the laser-based scanner to output a second laser beam in a second plane while the robotic body is at the second location;
controlling capture by the camera of a second image of the object, the second image representing at least part of the object and representing the second laser beam based on a second line produced by an intersection of a second plane of the second laser beam and the object at a height above the surface;
determining whether at least part of the laser-based scanner is misaligned based on a difference between the first line and the second line;
determining an amount of misalignment of the laser-based scanner based on at least one of a location or an orientation of the first line and the second line;

wherein determining the amount of misalignment of the laser-based scanner is also based on an incline of the surface; and wherein the one or more processing devices comprises one or more of the following: one or more microcontrollers, one or more microprocessors, programmable logic, one or more application-specific integrated circuits, or solid state circuitry.

* * * * *